United States Patent
Mäder et al.

(10) Patent No.: US 7,910,642 B2
(45) Date of Patent: Mar. 22, 2011

(54) STABILIZATION OF POLYETHER POLYOL, POLYESTER POLYOL OR POLYURETHANE COMPOSITIONS

(75) Inventors: Dietmar Mäder, Freiburg (DE); Pierre Rota-Graziosi, Mulhouse (FR)

(73) Assignee: BASF SE, Ludwigshafen (DE)

( * ) Notice: Subject to any disclaimer, the term of this patent is extended or adjusted under 35 U.S.C. 154(b) by 848 days.

(21) Appl. No.: 11/630,230

(22) PCT Filed: Jun. 20, 2005

(86) PCT No.: PCT/EP2005/052843
§ 371 (c)(1), (2), (4) Date: Jun. 20, 2007

(87) PCT Pub. No.: WO2006/003092
PCT Pub. Date: Jan. 12, 2006

(65) Prior Publication Data
US 2008/0033080 A1     Feb. 7, 2008

(30) Foreign Application Priority Data

Jun. 30, 2004 (EP) .................................. 04103062
Sep. 15, 2004 (EP) .................................. 04104456

(51) Int. Cl.
C08K 5/34 (2006.01)
C08K 5/3435 (2006.01)
C08K 5/3492 (2006.01)
C08K 5/10 (2006.01)
C08K 5/524 (2006.01)

(52) U.S. Cl. .......... 524/102; 524/99; 524/100; 524/227; 524/291

(58) Field of Classification Search ............ 524/99, 524/102, 227, 291, 100, 120
See application file for complete search history.

(56) References Cited

U.S. PATENT DOCUMENTS

| 4,935,275 | A | 6/1990 | Ushida et al. ............. 428/31 |
| 6,881,774 | B2 | 4/2005 | Schrinner et al. |
| 7,148,278 | B2 * | 12/2006 | Bulpett et al. ............. 524/291 |

FOREIGN PATENT DOCUMENTS

| CN | 1407005 A | 4/2003 |
| DE | 10148702 | 4/2003 |
| EP | 0714931 | 6/1996 |
| WO | 03/078148 | 9/2003 |
| WO | 03/095543 | 11/2003 |
| WO | 2004/068217 | 8/2004 |

OTHER PUBLICATIONS

Derwent Abstract 2003-470465/45 for DE 10148702, Apr. 10, 2003.
English language abstract for EP 0714931, Jun. 5, 1996.

* cited by examiner

*Primary Examiner* — Kriellion A Sanders
(74) *Attorney, Agent, or Firm* — Tyler A. Stevenson

(57) ABSTRACT

The present invention pertains to compositions comprising
(a) a polyether polyol, a polyester polyol or a polyurethane,
(b) a UV-absorber of formula (I) and/or a hindered amine light stabilizer of formula (II)

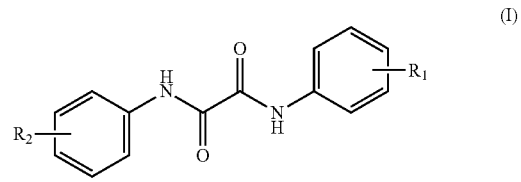

(I)

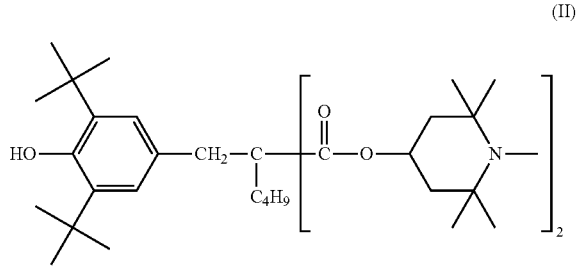

(II)

wherein $R_1$ and $R_2$ are each independently $C_1$-$C_4$alkyl or $C_1$-$C_4$alkyoxy,
and
(c) at least one further UV-absorber and/or hindered amine light stabilizer if only one of the components (I) and (II) is present
with the proviso that component (c) is not a compound of formula (A)-(D) as defined in claim 1.

4 Claims, No Drawings

STABILIZATION OF POLYETHER POLYOL, POLYESTER POLYOL OR POLYURETHANE COMPOSITIONS

The present invention pertains to compositions comprising a polyether polyol, a polyester polyol or a polyurethane susceptible to light induced degradation, and a mixture of at least two different light stabilizers, one of them being a specific UV-absorber and/or hindered amine light stabilizer.

DE 101 48 702 A1 pertains to stabilizer blends comprising an antioxidant, a HALS compound, a UV-absorber and a phosphorus compound. The initial yellowness of thermoplastic polyurethane stabilized with such a blend of stabilizers is not so great.

WO 03/095543 relates to stabilizer mixtures for polymer substrates comprising benzylidene-bis-malonates and at least one compound selected from the group consisting of UV-absorbers, hindered amine stabilizers, sterically hindered phenols, organophosphines, organophosphites and organophosphonites. Such stabilizer mixtures provide protection of polymeric substrates against the damaging influence of light exposure by long term storage of polymers.

EP 0714931 A discloses a mixture of Tinuvin® 312, Tinuvin® 770 and Chimassorb® 81 in a polyurethane.

WO 2004/068217 A describes a polyurethane composition comprising Tinuvin® 144, Tinuvin® 765 and Irganox® 1010.

WO 03/078148 A relates to a polyurethane composition comprising Tinuvin® 144, Tinuvin® 765 and Uvinul® 3040.

There is a strong demand from the polyurethane industry to have systems with excellent initial color and good light fastness. This is especially important for the shoe industry where good color stability is required, e.g. for thermoplastic polyurethane (TPU). Furthermore, there is a need for non-yellowing or low-yellowing polyurethane hot melt adhesives and silylated polyurethane (SPUR) sealants and artificial leather, especially based on aromatic isocyanates.

The polyether polyol, polyester polyol or polyurethane compositions according to the present invention have an excellent initial color after processing, good light stability and also good gas fading resistance.

The present invention pertains to a composition comprising
(a) a polyether polyol, a polyester polyol or a polyurethane,
(b) a UV-absorber of formula (I) and/or a hindered amine light stabilizer of formula (II)

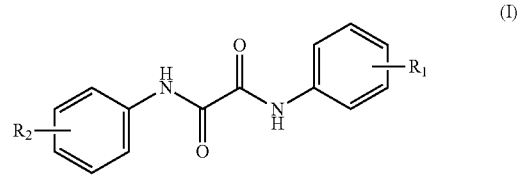

(I)

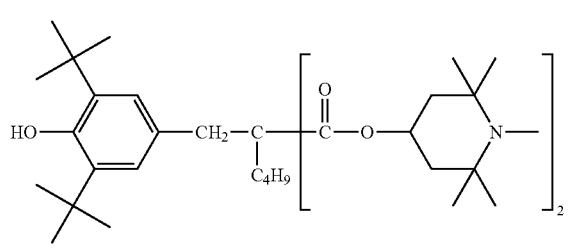

(II)

wherein $R_1$ and $R_2$ are each independently $C_1$-$C_4$alkyl or $C_1$-$C_4$alkyoxy, and
(c) at least one further UV-absorber and/or hindered amine light stabilizer if only one of the components (I) and (II) is present
with the proviso that component (c) is not a compound of formula (A)-(D)

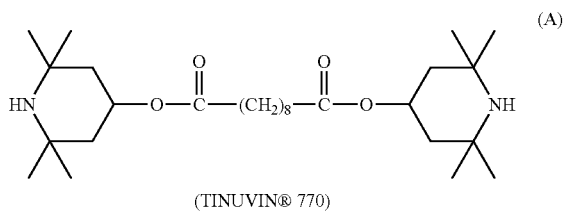

(TINUVIN® 770)

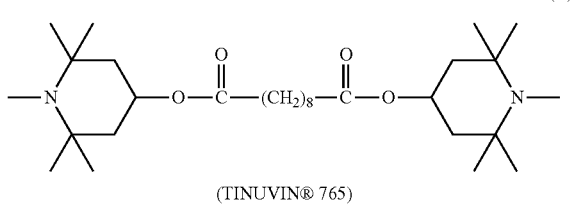

(TINUVIN® 765)

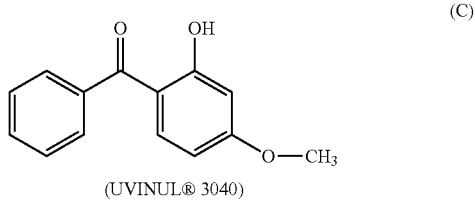

(UVINUL® 3040)

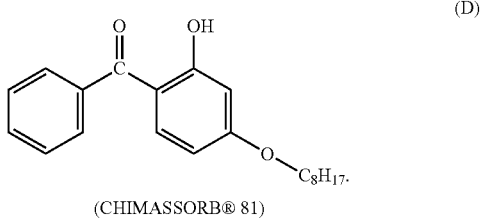

(CHIMASSORB® 81)

As evident from this definition, the composition of this invention must contain either (i) a UV-absorber of formula (I) and a hindered amine of formula (II); or (ii) a UV-absorber of formula (I) and a UV-absorber or/and a hindered amine different from formulae (I) and (II); or (iii) a hindered amine of formula (II) and a UV-absorber or/and a hindered amine different from formulae (I) and (II). Of course, also in case (i) further UV-absorbers or/and hindered amines may be present.

Of interest is an instant composition that comprises as component (c) a hindered amine light stabilizer of formula HA-1 to HA-11 or a UV-absorber of formula UV-1 to UV-8 as defined below.

Of particular interest is an instant composition comprising as component (c) a hindered amine light stabilizer of formula HA-1 to HA-11 or a UV-absorber of formula UV-1 to UV-7.

In addition to the light stabilizers (b) and/or (c) the compositions of the instant invention preferably contain further additives.

Such further additives may for example be:
1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, 2,4-dodecylthiomethyl-6-tert-butylphenol, 2,4-dodecylthiomethyl-6-methylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane.

1.7. O—, N— and S-benzyl compounds, for example 3,5, 3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris (3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3, 5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, dinonylphenothiazine, mono-nonylphenothiazine, a mixture of mono- and dialkylated nonylphenothiazine, N,N,N',N'-tetraphenyl-1,4-diaminobut-2-ene, a mixture of one of the above disclosed unsubstituted or substituted diphenylamine with one of the above disclosed unsubstituted or substituted phenothiazine.

2. Other UV absorbers and light stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.1a. 4-Hydroxybenzoates, for example 2,4-di-tert-butylphenyl 3,5-di-tert-butyl-4-hydroxybenzoate, 3,5-di-tert-butyl-4-hydroxybenzoate.

2.2. 2-Hydroxybenzophenones and Formamidines, for example the 4-hydroxy, 4-decyloxy, 4-dodecyloxy, 4-benzyloxy, 4,2',4'-trihydroxy and 2'-hydroxy-4,4'-dimethoxy benzophenones; N-alkyl-N,N'-diarylformamidines, for example, benzoic acid, 4-[[(methylphenylamino)methylene]amino]ethyl ester [Tinuvin 101®, Ciba Specialty Chemicals Inc.]; benzoic acid, 4-[[(ethylphenylamino)methylene]amino]ethyl ester; 2-propenoic acid, 3-(4-methoxyphenyl)-, 2-ethylhexyl ester [Uvinul 3088®, BASF]; 2-propenoic acid, 2-cyano-3,3-diphenyl-, ethyl ester [Uvinul 3035®, BASF]; or 2-propenoic acid, 2-cyano-3,3-diphenyl-, 2-ethylhexyl ester [Uvinul 3039®, BASF].

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Further hindered amine light stabilizers, for example bis(2,2,6,6-tetramethyl-4-piperidyl)succinate, bis(1-octyloxy-2,2,6,6-tetramethyl-4-piperidyl)sebacate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine; HA-6) as defined below.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite; tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

11. Other additives, for example plasticisers, lubricants, emulsifiers, pigments, rheology additives, catalysts, flow-control agents, optical brighteners, flameproofing agents, antistatic agents and blowing agents.

12. Benzofuranones and indolinones, for example those disclosed in U.S. Pat. Nos. 4,325,863; 4,338,244; 5,175,312; 5,216,052; 5,252,643; DE-A-4316611; DE-A4316622; DE-A-4316876; EP-A-0589839; EP-A-0591102 or EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one or 3-(2-acetyl-5-isooctylphenyl)-5-isooctylbenzofuran-2-one.

13. Anti-gas fading agents, for example 1,1,1',1'-tetramethyl-4,4'-(methylene-di-p-phenylene)disemicarbazide; 1,6-hexamethylene bis(N,N-dimethylsemicarbazide); 11-[6-[[(2,2-dimethylhydrazino)carbonyl]amino]hexyl]-10,12-dioxo-, bis(2,2-dimethylhydrazide).

The further additives are added, for example, in concentrations of 0.01 to 10%, relative to the total weight of the composition of this invention.

Preferably, such further stabilizers are antioxidants, further light-stabilizers and/or processing stabilizers.

More preferably, such further stabilizers are phenolic and/or aminic antioxidants, further hindered amine light stabilizers, further UV-absorbers, phosphites, phosphonites and/or benzofuranones.

Of outstanding interest are compositions, where the further stabilizers are further hindered amine light stabilizers, further UV-absorbers, phenolic antioxidants and/or phosphites.

Of interest are also such compositions, wherein component (b) is a combination of a UV-absorber of formula (I) and a hindered amine light stabilizer of formula (II).

Preferred are compositions, wherein the UV-absorber of formula (I) is a compound of formula (Ia).

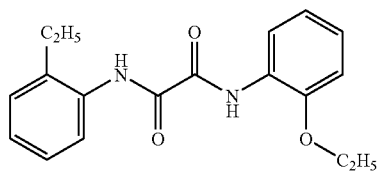

(Ia)

An embodiment of the present invention is a composition, wherein component (b) is a UV-absorber of formula (I) and component (c) is a hindered amine light stabilizer.

Another embodiment of the present invention is a composition, wherein component (b) is a hindered amine light stabilizer of formula (II) and component (c) is a UV-absorber.

Of interest are compositions, wherein the overall amount of component (b) and (c) is 0.01% to 5%, based on the weight of the composition.

Of special interest are compositions, wherein the overall amount of component (b) and (c) is 0.5% to 2%, based on the weight of the composition.

Preferred are compositions, wherein the ratio of components (b):(c) or of the compounds of formulae (I):(II) respectively is from 10:1 to 1:10.

Most preferred are compositions, wherein the ratio of components (b):(c) or of the compounds of formulae (I):(II) respectively is from 3:1 to 1:3.

Preferably, the compositions according to this invention do not contain benzylidene-bis-malonates. Such benzylidene-bis-malonates are disclosed in WO 03/095543.

The present invention also pertains to the use of a mixture of component (b) and (c) as defined herein as stabilizer for a polyether polyol, a polyester polyol or a polyurethane against degradation by light, oxygen and/or heat.

Preferred is the use of such mixtures that additionally comprise further additives and/or stabilizers. The further additives and/or stabilizers may be as defined herein.

The present invention also pertains to a process for stabilizing a polyether polyol, a polyester polyol or a polyurethane against degradation by light, oxygen and/or heat, which process comprises incorporating into said material a mixture of component (b) and (c) as defined herein.

Preferred is a process for stabilizing a polyether polyol, a polyester polyol or a polyurethane against degradation by light, oxygen and/or heat, which process comprises incorporating into said material a mixture comprising component (b) and (c) as defined herein and additionally comprises further additives and/or stabilizers. The further additives and/or stabilizers may be as defined herein.

Hindered amine light stabilizers are preferably compounds containing at least one group of formula (III)

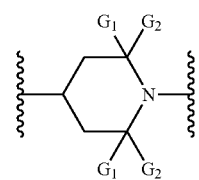

(III)

wherein $G_1$ and $G_2$ are independently alkyl of 1 to 4 carbon atoms, or $G_1$ and $G_2$ together are pentamethylene; preferably $G_1$ and $G_2$ are each methyl.

} specifies the border of a chemical group and does not have a chemical meaning by itself.

The hindered amine light stabilizers useful as component (c) may be the ones mentioned in 2.6. herein above and the ones disclosed in WO 01/62836, WO 02/02706 and DE 10008367, which are incorporated here by reference.

Preferred hindered amine light stabilizers are compounds of formulae (100)-(104) or 7-Oxa-3,20-diazadispiro[5.1.11.2]heneicosan-21-one, 2,2,4,4-tetramethyl-20-(oxiranylmethyl)-, polymer with (chloromethyl)oxirane;

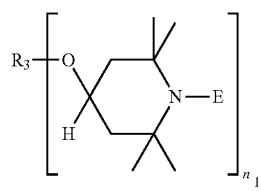
(100)

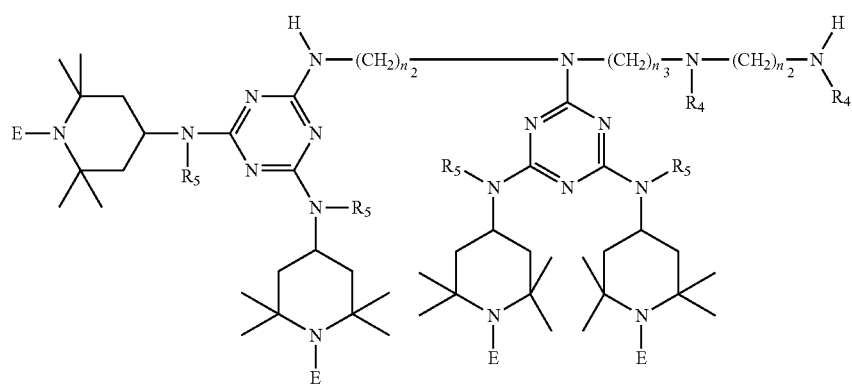
(101)

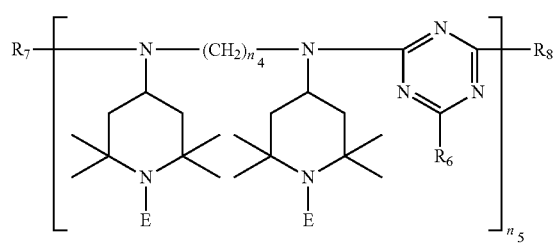
(102)

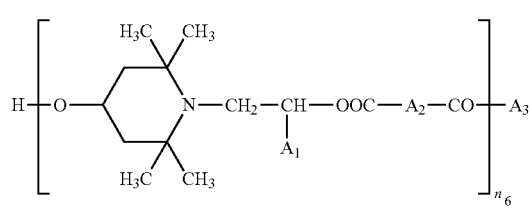
(103)

(104)

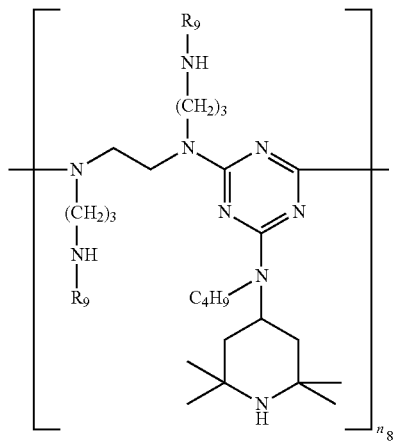

$R_9 =$ 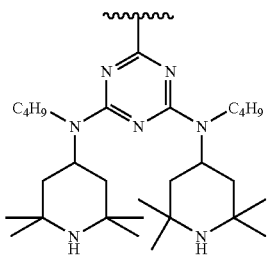

wherein

E is hydrogen, $C_1$-$C_{18}$alkyl, $C_1$-$C_{18}$alkoxy or $C_1$-$C_{18}$alkoxy substituted by 1 OH;

$n_1$ is 1 or 2;

when $n_1$ is 1, $R_3$ is $C_1$-$C_{25}$alkyl or —CO—$R_{10}$;

when $n_1$ is 2, $R_3$ is $C_2$-$C_{14}$alkylene or —CO—$R_{11}$—CO—;

$R_{10}$ is $C_1$-$C_{25}$alkyl;

$R_{11}$ is $C_2$-$C_{14}$-alkylene;

$n_2$ is 2 to 4;

$n_3$ is 1 to 3, $R_5$ is hydrogen or $C_1$-$C_{12}$alkyl;

$R_4$ is the group $T_1$, $T_1$ is

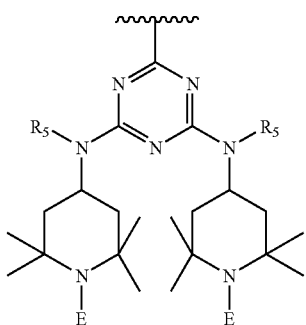

$n_4$ is 2 to 8, $n_5$ is 1 to 50;

$R_6$ is morpholino, piperidino, 1-piperizinyl, alkylamino of 1 to 8 carbon atoms, especially branched alkylamino of 3 to 8 carbon atoms such as tert-octylamino, —N(alkyl)$T_2$ with alkyl of 1 to 8 carbon atoms, or —N(alkyl)$_2$ of 2 to 16 carbon atoms, $T_2$ is

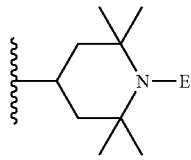

$R_7$ is hydrogen, acyl of 2 to 4 carbon atoms, carbamoyl substituted by alkyl of 1 to 4 carbon atoms, s-triazinyl substituted once by chlorine and once by $R_6$, or s-triazinyl substituted twice by $R_6$ with the condition that the two $R_6$ substituents may be different;

$R_8$ is chlorine, amino substituted by alkyl of 1 to 8 carbon atoms or by $T_2$, —N(alkyl)$T_2$ with alkyl of 1 to 8 carbon atoms, —N(alkyl)$_2$ of 2 to 16 carbon atoms, or the group $T_3$, $T_3$ is

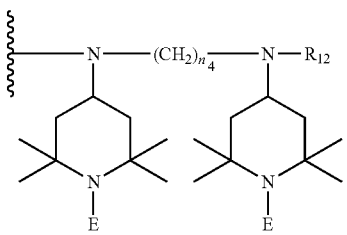

$R_{12}$ is hydrogen, acyl of 2 to 4 carbon atoms, carbamoyl substituted by alkyl of 1 to 4 carbon atoms, s-triazinyl substituted twice by —N(alkyl)$_2$ of 2 to 16 carbon atoms or s-triazinyl substituted twice by —N(alkyl)$T_2$ with alkyl of 1 to 8 carbon atoms;

$A_1$ is hydrogen or $C_1$-$C_4$alkyl, $A_2$ is a direct bond or $C_1$-$C_{10}$alkylene, $A_3$ is $C_1$-$C_4$alkyl or $C_1$-$C_4$alkoxy and $n_6$ is a number from 2 to 50, preferably 2 to 20;

$n_8$ is 2 to 12.

Of particular interest as component (c) are UV-absorbers of the hydroxyphenyl-triazine, benzotriazole, benzophenone, oxanilide, acrylate and cyanacrylate classes.

The hydroxyphenyl triazine UV absorber usually is selected from known compounds, described e.g. in GB-A-975966, EP-A-434608, U.S. Pat. Nos. 4,619,956, 5,298,067, EP-A-530135, EP-A-520938, EP-A-531258, U.S. Pat. Nos. 5,556,973, 5,959,008, 6,184,375, 6,117,997; preferred are compounds as described in U.S. Pat. Nos. 5,998,116, 6,255,483, 6,060,543.

Examples for hydroxyphenyl triazine UV absorbers are compounds conforming to formula (200), (201) or (202)

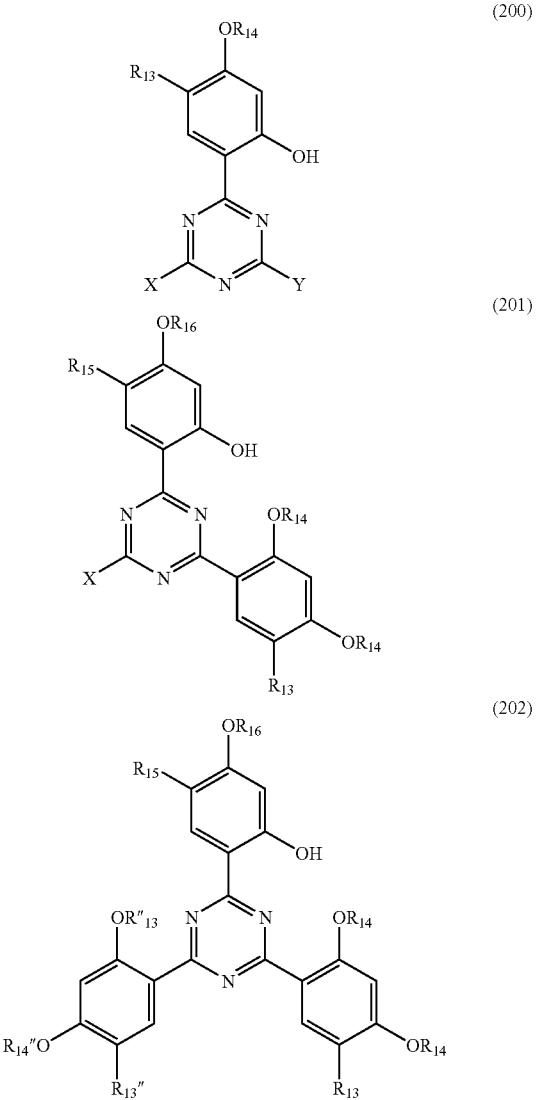

wherein

X and Y are independently phenyl, naphthyl, or said phenyl or said naphthyl substituted by one to three alkyl of 1 to 6 carbon atoms, by halogen, by hydroxy or by alkoxy of 1 to 6 carbon atoms or by mixtures thereof; or are independently $Z_1$ or $Z_2$;

$R_{13}$ is hydrogen, straight or branched chain alkyl of 1 to 24 carbon atoms, cycloalkyl of 5 to 12 carbon atoms, phenylalkyl of 7 to 15 carbon atoms, halogen, —$SR_{17}$, —$SOR_{17}$ or —$SO_2R_{17}$; or said alkyl, said cycloalkyl or said phenylalkyl substituted by one to three halogen, —$R_{18}$, —$OR_{19}$, —$N(R_{19})_2$, —$COR_{19}$, —$COOR_{19}$, —$OCOR_{19}$, —CN, —$NO_2$, —$SR_{19}$, —$SOR_{19}$, —$SO_2R_{19}$ or —$P(O)(OR_{19})_2$, morpholinyl, piperidinyl, 2,2,6,6-tetramethylpiperidinyl, piperazinyl or N-methylpiperidinyl groups or combinations thereof; or said alkyl or said cycloalkyl interrupted by one to four phenylene, —O—, —$NR_{19}$—, —$CONR_{19}$—, —COO—, —OCO— or —CO groups or combinations thereof; or said alkyl or said cycloalkyl both substituted and interrupted by combinations of the groups mentioned above;

$R_{17}$ is alkyl of 1 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms;

$R_{18}$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof; or straight or branched chain alkenyl of 2 to 18 carbon atoms;

$R_{19}$ is defined as is $R_{18}$; or $R_{19}$ is also hydrogen or straight or branched chain alkyl of 1 to 24 carbon atoms, alkenyl of 2 to 24 carbon atoms; or $R_{19}$ is a group for formula

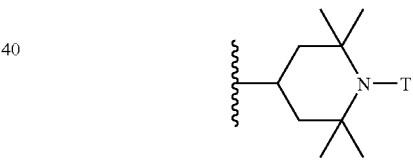

T is hydrogen, oxyl, hydroxyl, —$OT_4$, alkyl of 1 to 24 carbon atoms, said alkyl substituted by one to three hydroxy; benzyl or alkanoyl of 2 to 18 carbon atoms;

$T_4$ is alkyl of 1 to 24 carbon atoms, cycloalkyl of 5 to 12 carbon atoms, alkenyl of 2 to 24 carbon atoms, cycloalkenyl of 5 to 12 carbon atoms, phenylalkyl of 7 to 15 carbon atoms, a radical of a saturated or unsaturated bicyclic or tricyclic hydrocarbon of 7 to 12 carbon atoms or aryl of 6 to 10 carbon atoms or said aryl substituted by one to three alkyl of 1 to 4 carbon atoms;

$R_{14}$ is hydrogen, straight or branched chain alkyl of 1 to 24 carbon atoms or cycloalkyl of 5 to 12 carbon atoms or $R_{20}$; or said alkyl or said cycloalkyl substituted by one to four halogen, hydroxy, epoxy, glycidyloxy, furyloxy, —$R_{18}$, —$OR_{19}$, —$N(R_{19})_2$, —$CON(R_{19})_2$, —$COR_{19}$, —$COOR_{19}$, —$OCOR_{19}$, —$OCOC(R_{19})$=$C(R_{19})_2$, —$C(R_{19})$=$CCOOR_{19}$, —CN, —NCO, or

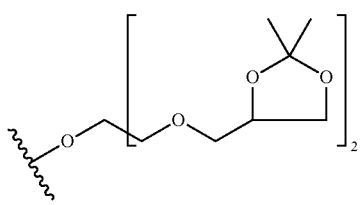

or combinations thereof; or said alkyl or said cycloalkyl interrupted by one to four epoxy, —O—, —NR$_{19}$—, —CONR$_{19}$—, —COO—, —OCO—, —CO—, —C(R$_{19}$)=C(R$_{19}$)COO—, —OCOC(R$_{19}$)=C(R$_{19}$)—, —C(R$_{19}$)=C(R$_{19}$)—, phenylene or phenylene-G-phenylene in which G is —O—, —S—, —SO$_2$—, —CH$_2$— or —C(CH$_3$)$_2$— or combinations thereof, or said alkyl or said cycloalkyl both substituted and interrupted by combinations of the groups mentioned above; or R$_{14}$ is —SO$_2$R$_{17}$ or —COR$_{21}$;

R$_{21}$ is straight or branched chain alkyl of 1 to 18 carbon atoms, straight or branched chain alkenyl of 2 to 12 carbon atoms, phenoxy, alkylamino of 1 to 12 carbon atoms, arylamino of 6 to 12 carbon atoms, —R$_2$COOH or —NH—R$_{23}$—NCO;

R$_{22}$ is alkylene of 2 to 14 carbon atoms or phenylene;

R$_{23}$ is alkylene of 2 to 24 carbon atoms, phenylene, tolylene, diphenylmethane or a group

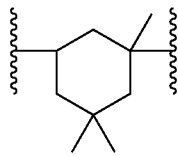

R$_{13}$', R$_{15}$ and R$_{13}$" are the same or different and are as defined for R$_{13}$;

R$_{14}$', R$_{16}$ and R$_{14}$" are the same or different and are as defined for R$_{14}$;

Z$_1$ is a group of formula

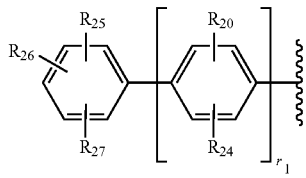

Z$_2$ is a group of formula

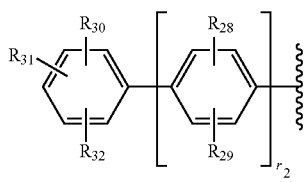

where
r$_{13}$ and r$_{14}$ are independently of each other 0 or 1;
R$_{20}$, R$_{24}$, R$_{25}$, R$_{26}$, R$_{27}$, R$_{28}$, R$_{29}$, R$_{30}$, R$_{31}$ and R$_{32}$ are independently of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, alkoxycarbonyl of 2 to 12 carbon atoms or aminocarbonyl; or R$_{26}$ and R$_{27}$ or R$_{31}$ and R$_{32}$ together with the phenyl radical to which they are attached are a cyclic radical interrupted by one to three —O— or —NR$_{19}$—.

Examples of hydroxyphenyltriazines are the compounds (a1)-(a19)

a1) 2,4,6-tris(2-hydroxy-4-octyloxyphenyl)-1,3,5-triazine, a2) 2-(2-hydroxy-4-octyloxyphenyl)-4,6-bis(2,4-dimethylphenyl)-1,3,5-triazine, a3) 2-(2,4-dihydroxyphenyl)-4,6-bis(2,4-dimethylphenyl)-1,3,5-triazine, a4) 2,4-bis(2-hydroxy-4-propyloxyphenyl)-6-(2,4-dimethylphenyl)-1,3,5-triazine, a5) 2-(2-hydroxy-4-octyloxyphenyl)-4,6-bis(4-methylphenyl)-1,3,5-triazine, a6) 2-(2-hydroxy-4-dodecyloxyphenyl)-4,6-bis(2,4-dimethylphenyl)-1,3,5-triazine, a7) 2-(2-hydroxy-4-tridecyloxyphenyl)-4,6-bis(2,4-dimethylphenyl)-1,3,5-triazine, a8) 2-[2-hydroxy-4-(2-hydroxy-3-butyloxypropoxy)phenyl]-4,6-bis(2,4-dimethylphenyl)-1,3,5-triazine, a9) 2-[2-hydroxy-4-(2-hydroxy-3-octyloxypropyloxy)phenyl]-4,6-bis(2,4-dimethylphenyl)-1,3,5-triazine, a10) 2-(2-hydroxy-4-[2-ethylhexyl]oxyphenyl)-4,6-di(4-phenylphenyl)-1,3,5-triazine, a11) 2-(2-hydroxy-4-[2-heptylcarbonyloxyethoxy]phenyl)-4,6-diphenyl-1,3,5-triazine, a12) 2-(2,4-dihydroxyphenyl)-4,6-diphenyl-1,3,5-triazine, a13) 2-[4-(dodecyloxy/tridecyloxy-2-hydroxypropoxy)-2-hydroxyphenyl]-4,6-bis(2,4-dimethylphenyl)1,3,5-triazine, a14) 2-[2-hydroxy-4-(2-hydroxy-3-dodecyloxypropoxy)phenyl]-4,6-bis(2,4-dimethylphenyl)-1,3,5-triazine, a15) 2-(2-hydroxy-4-hexyloxy)phenyl-4,6-diphenyl-1,3,5-triazine, a16) 2-(2-hydroxy-4-methoxyphenyl)-4,6-diphenyl-1,3,5-triazine, a17) 2,4,6-tris[2-hydroxy-4-(3-butoxy-2-hydroxypropoxy)phenyl]-1,3,5-triazine, a18) 2-(2-hydroxyphenyl)-4-(4-methoxyphenyl)-6-phenyl-1,3,5-triazine, a19) 2-{2-hydroxy-4-[3-(2-ethylhexyl-1-oxy)-2-hydroxypropyloxy]phenyl}-4,6-bis(2,4-dimethylphenyl)-1,3,5-triazine.

Examples of UV-absorber of the benzotriazole class are compounds of formula (206) and/or (207),

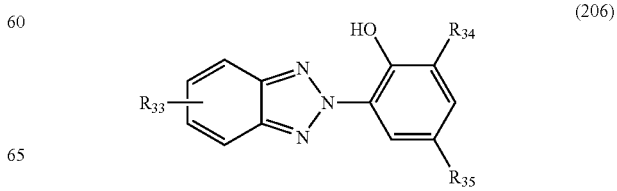

-continued

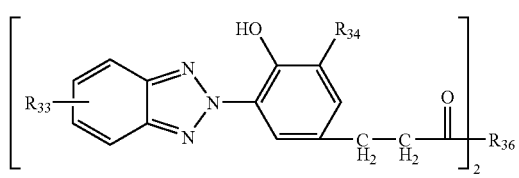
(207)

wherein
$R_{33}$ is hydrogen, halogen, $C_1$-$C_4$alkyl or $C_1$-$C_8$alkoxy;
$R_{34}$ is hydrogen, $C_1$-$C_{18}$alkyl or $C_1$-$C_8$alkyl substituted by phenyl;
$R_{35}$ is $C_1$-$C_{12}$alkyl, —$CH_2CH_2$—$CO$—$R_{37}$ or $C_1$-$C_8$alkyl substituted by phenyl;
$R_{37}$ is a monovalent polyethylene oxide residue;
$R_{36}$ is a divalent polyethylene oxide residue;
Examples of benzotriazoles are the compounds (b1)-(b23)
b1) 2-(2'-hydroxy-5'-methylphenyl)benzotriazole,
b2) 2-(3',5'-di-tert-butyl-2'-hydroxyphenyl)benzotriazole,
b3) 2-(5'-tert-butyl-2'-hydroxyphenyl)benzotriazole,
b4) 2-(2'-hydroxy-5'-(1,1,3,3-tetramethylbutyl)phenyl)benzotriazole,
b5) 2-(3',5'-di-tert-butyl-2'-hydroxyphenyl)-5-chlorobenzotriazole,
b6) 2-(3'-tert-butyl-2'-hydroxy-5'-methylphenyl)-5-chlorobenzotriazole,
b7) 2-(3'-sec-butyl-5'-tert-butyl-2'-hydroxyphenyl)benzotriazole,
b8) 2-(2'-hydroxy-4'-octyloxyphenyl)benzotriazole,
b9) 2-(3',5'-di-tert-amyl-2'-hydroxyphenyl)benzotriazole,
b10) 2-(3',5'-bis(α,α-dimethylbenzyl)-2'-hydroxyphenyl)benzotriazole,
b11) 2-(3'-tert-butyl-2'-hydroxy-5'-(2-octyloxycarbonylethyl)phenyl)-5-chlorobenzotriazole,
b12) 2-(3'-tert-butyl-5'-[2-(2-ethylhexyloxy)carbonylethyl]-2'-hydroxyphenyl)-5-chlorobenzotriazole,
b13) 2-(3'-tert-butyl-2'-hydroxy-5'-(2-methoxycarbonylethyl)phenyl)-5-chlorobenzotriazole,
b14) 2-(3'-tert-butyl-2'-hydroxy-5'-(2-methoxycarbonylethyl)phenyl)benzotriazole,
b15) 2-(3'-tert-butyl-2'-hydroxy-5'-(2-octyloxycarbonylethyl)phenyl)benzotriazole,
b16) 2-(3'-tert-butyl-5'-[2-(2-ethylhexyloxy)carbonylethyl]-2'-hydroxyphenyl)benzotriazole,
b17) 2-(3'-dodecyl-2'-hydroxy-5'-methylphenyl)benzotriazole,
b18) 2-(3'-tert-butyl-2'-hydroxy-5'-(2-isooctyloxycarbonylethyl)phenylbenzotriazole,
b19) 2,2'-methylenebis[4-(1,1,3,3-tetramethylbutyl)-6-benzotriazole-2-ylphenol],
b20) the transesterification product of 2-[3'-tert-butyl-5'-(2-methoxycarbonylethyl)-2'-hydroxyphenyl]-2H-benzotriazole with polyethylene glycol 300,
b21) [R—$CH_2CH_2$—$COO$—$CH_2CH_2$—]$_2$, where R=3'-tert-butyl-4'-hydroxy-5'-2H-benzotriazol-2-ylphenyl,
b22) 2-[2'-hydroxy-3'-(α,α-dimethylbenzyl)-5'-(1,1,3,3-tetramethylbutyl)phenyl]benzotriazole,
b23) 2-[2'-hydroxy-3'-(1,1,3,3-tetramethylbutyl)-5'-(α,α-dimethylbenzyl)phenyl]benzotriazole.
The phenolic antioxidant may be a compound of formula (300), (301) or (302)

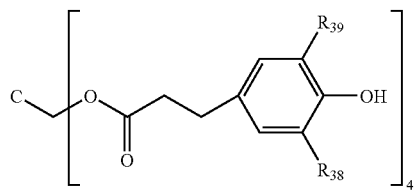
(300)

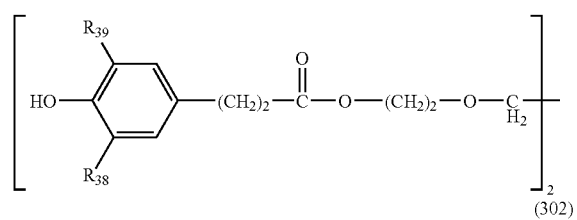
(301)

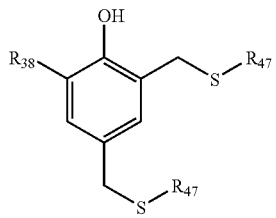
(302)

wherein $R_{38}$ and $R_{39}$ are independently $C_1$-$C_3$alkyl, $R_{47}$ is $C_1$-$C_{18}$alkyl;
or the phenolic antioxidant may be any compound listed in items 1.1-1.17 in the list of stabilizers given above.

The phosphite may be a compound of formula (400) or (401)

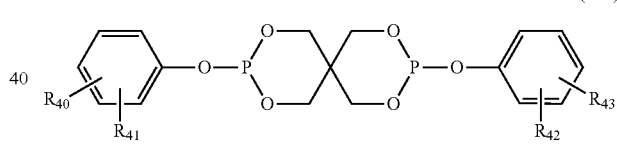
(400)

(401)

wherein $R_{40}$, $R_{41}$, $R_{42}$ and $R_{43}$ are independently $C_1$-$C_8$alkyl;
or $R_{40}$ and $R_{42}$ may independently be hydrogen;
$R_{44}$, $R_{45}$ and $R_{46}$ are independently hydrogen or $C_1$-$C_8$alkyl;
or the phosphite may be any phosphite compound listed in item 4 in the list of stabilizers given above.

The term alkyl may comprise within the limits of the given number of carbon atoms, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, 2-methylheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl or dodecyl.

In the context of the description of the present invention, the term alkylene comprises within the limits of the given number of carbon atoms, for example methylene and the branched and unbranched isomers of ethylene, propylene, butylene, pentylene, hexylene, heptylene, octylene, nonylene, decylene, undecylene, dodecylene, tridecylene and tetradecylene.

The term alkoxy may comprise within the limits of the given number of carbon atoms, for example methoxy and ethoxy and the branched and unbranched isomers of propoxy, butoxy, pentoxy, hexoxy, heptoxy, octoxy, nonoxy, decoxy, undecoxy, dodecoxy, tridecoxy, tetradecoxy, pentadecoxy, hexadecoxy, heptadecoxy and octadecoxy.

The term halogen comprises for example chlorine, bromine and iodine.

The term aryl comprises for example phenyl and naphthyl.

Examples of alkenyl are vinyl, allyl, butenyl, pentenyl, hexenyl, heptenyl, octenyl, nonenyl, decenyl, undecenyl and dodecenyl.

Of special interest are the following hindered amine light stabilizers:

HA-1)

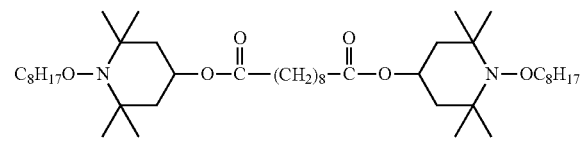

(TINUVIN® 123)

HA-2)

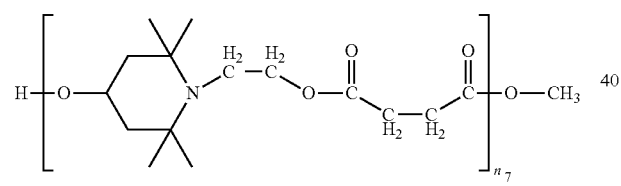

$n_7$ is 2 to 50, preferably 2 to 20, particular preference is given to the commercial product TINUVIN® 622.

HA-3)

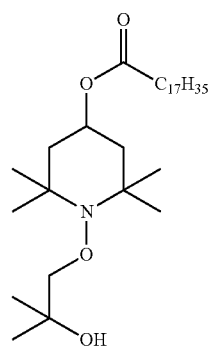

HA-4)

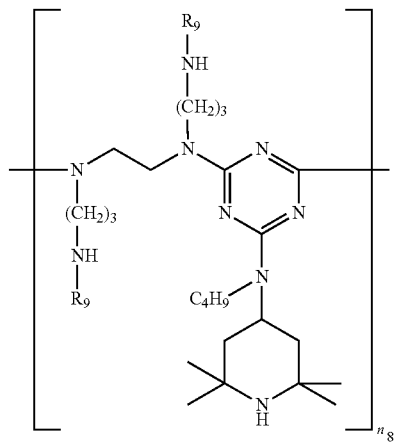

$R_9 = $

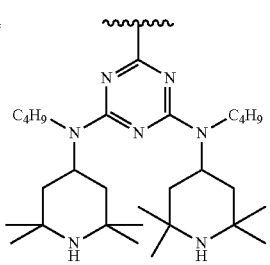

this compound is described in U.S. Pat. No. 4,477,615; $n_8$ is 2 to 12; particular preference is given to the commercial product UVASORB® HA-88.

HA-5)

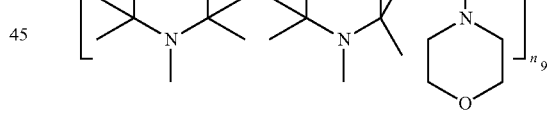

$n_9$ is 2 to 50, preferably 2 to 20, the endgroups preferably being particular preference is given to the commercial product CYASORB® UV-3529.

HA-6)

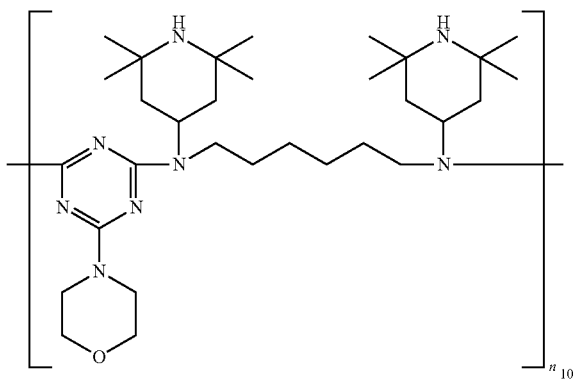

$n_{10}$ is 2 to 50, preferably 2 to 20, the endgroups preferably being

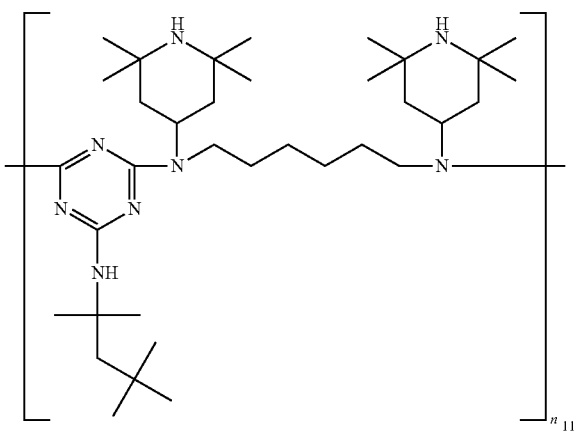

particular preference is given to the commercial product CYASORB® UV-3346.

HA-7)

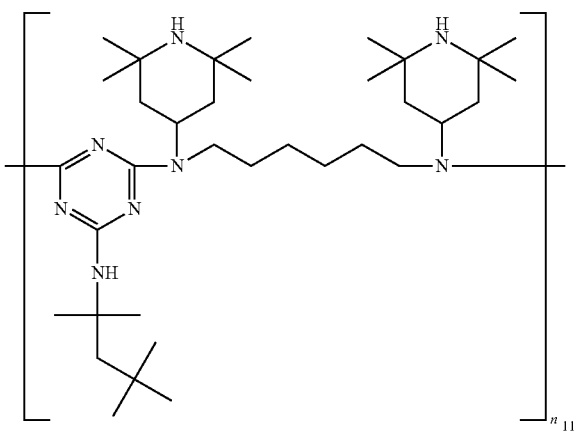

$n_{11}$ is 2 to 50, preferably 2 to 20, with the endgroups preferably being

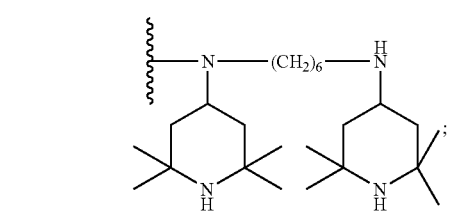

particular preference is given to the commercial product CHIMASSORB® 944.

HA-8)

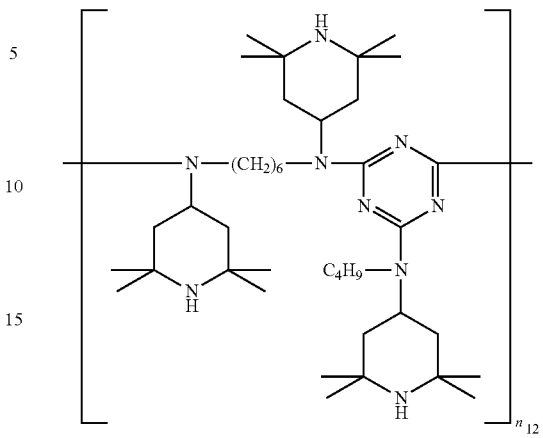

$n_{12}$ is 2 to 50, preferably 2 to 20, with the endgroups preferably being

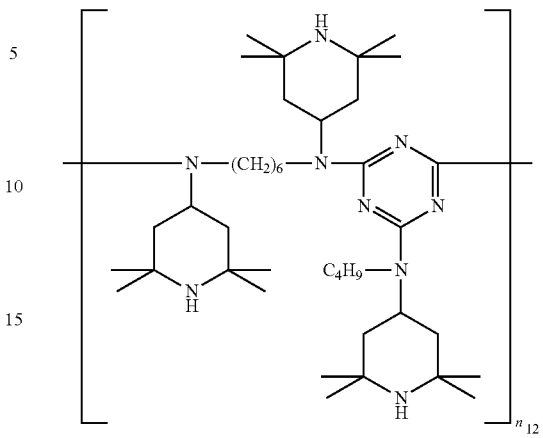

particular preference is given to the commercial product CHIMASSORB® 2020.

HA-9)

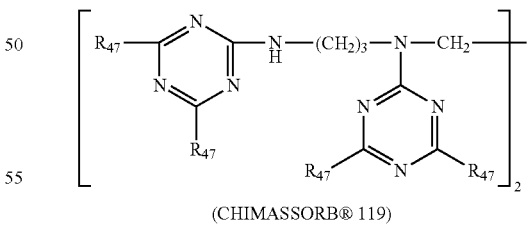

(CHIMASSORB® 119)

$R_{47} = $ 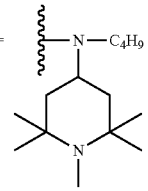

HA-10)

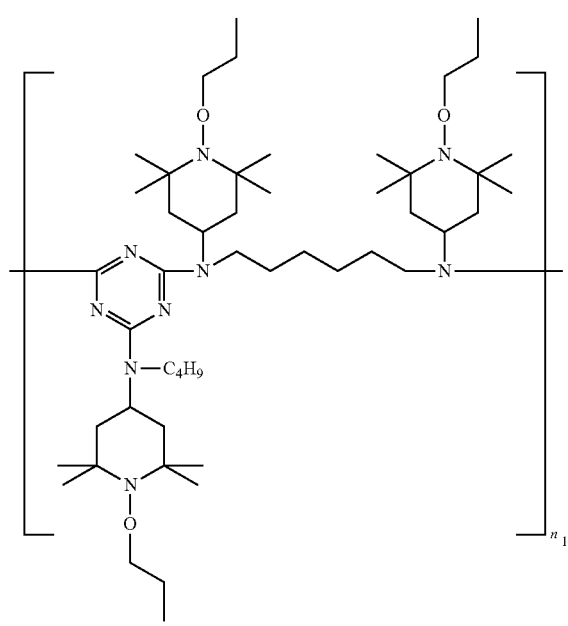

$n_{14}$ is 2 to 50, preferably 2 to 20, with the endgroups preferably being

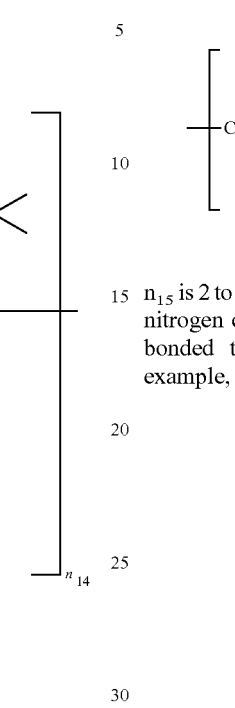

particular preference is given to the commercial product Tinuvin® NOR 371.

HA-11) 7-Oxa-3,20-diazadispiro[5.1.11.2]heneicosan-21-one, 2,2,4,4-tetramethyl-20-(oxiranylmethyl)-, polymer with (chloromethyl)oxirane, for example

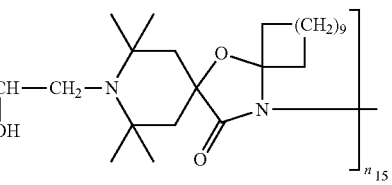

$n_{15}$ is 2 to 50, for example 2 to 25; the end group bonded to the nitrogen can be, for example, hydrogen and the end group bonded to the 2-hydroxypropylene radical can be, for example,

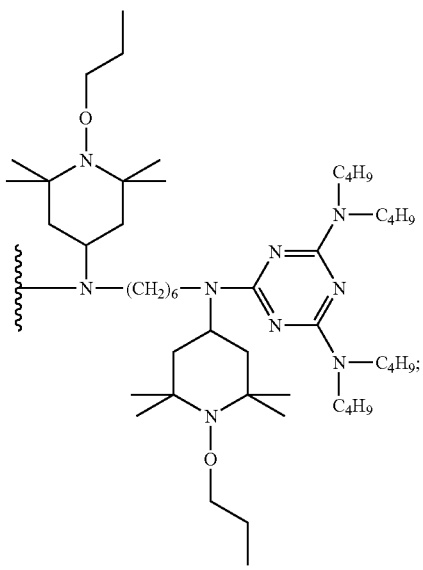

particular preference is given to the commercial product Hostavin® N30.

Of interest are the following UV-absorbers:

UV-1)

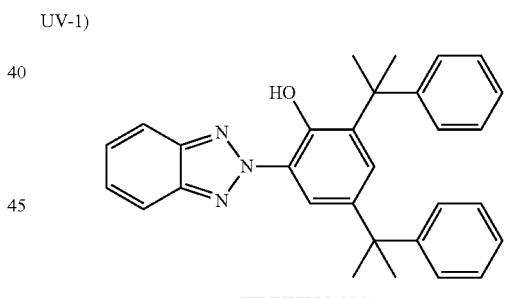

(TINUVIN® 234)

UV-2)

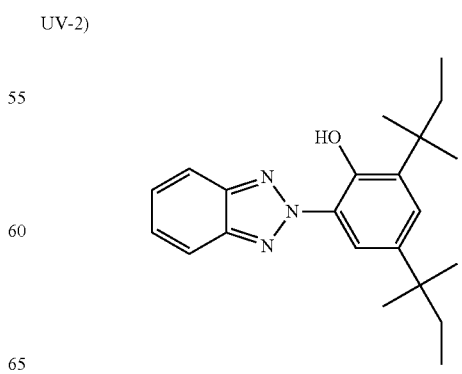

(TINUVIN® 328)

-continued

UV-3)

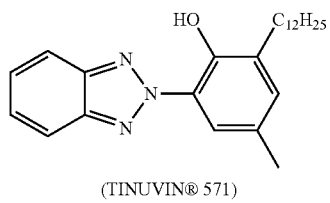

(TINUVIN® 571)

UV-4)

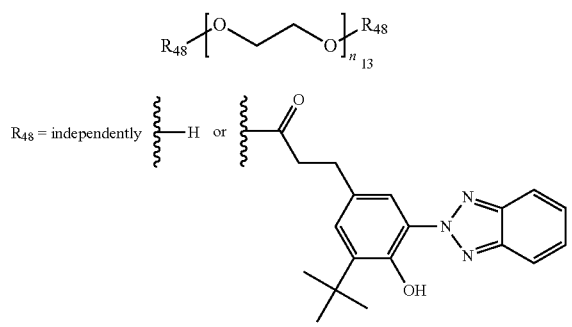

$R_{48}$ = independently —H or $n_{13}$ is 2 to 20, for example 3 to 10; preferably, this compound is a mixture of polyethylene glycol and mono- and diesters; particular preference is given to the commercial product TINUVIN® 213.

UV-5)

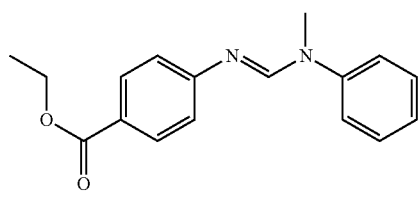

(TINUVIN® 101)

UV-6)

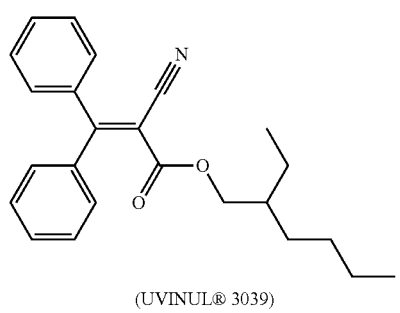

(UVINUL® 3039)

UV-7)

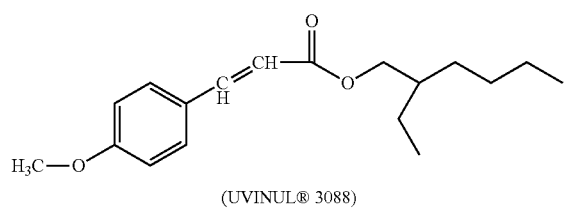

(UVINUL® 3088)

-continued

UV-8)

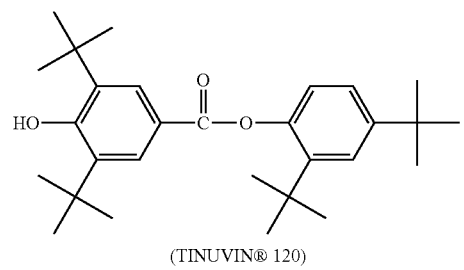

(TINUVIN® 120)

Of particular interest are the UV-absorbers UV-1 to UV-7.
Preferably, the phenolic antioxidant is

PHA-1)

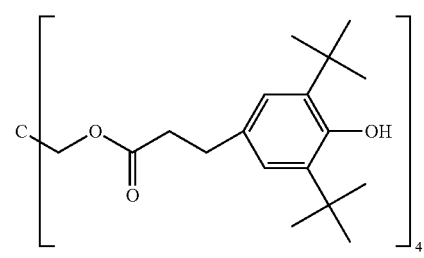

(IRGANOX® 1010)

PHA-2)

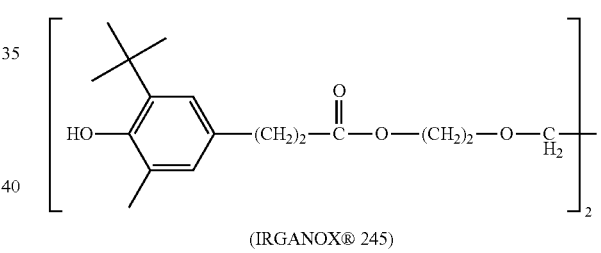

(IRGANOX® 245)

PHA-3)

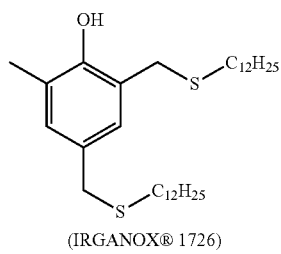

(IRGANOX® 1726)

Preferably, phosphite is

PHOS-1)

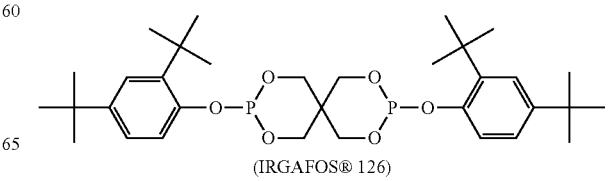

(IRGAFOS® 126)

-continued

PHOS-2)

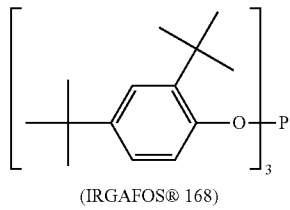

(IRGAFOS® 168)

The additives and stabilizers mentioned herein are mainly commercially available.

Preferred embodiments of this invention are a polyether polyol, a polyester polyol or a polyurethane comprising one of the following blends of commercially available additives:
Tinuvin® 234/Tinuvin® 144;
Tinuvin® 101/Tinuvin® 144;
Tinuvin® 312/Tinuvin® 144;
Tinuvin® 120/Tinuvin® 144;
Tinuvin® 312/Tinuvin® 622/Irganox® 1010;
Tinuvin® 312/Tinuvin® 123/Irganox® 1010;
Tinuvin® 312/Chimassorb® 119/Irganox® 1010;
Tinuvin® 312/Chimassorb® 944/Irganox® 1010;
Tinuvin® 312/Chimassorb® 2020/Irganox® 1010;
Tinuvin® 312/Cyasorb® UV 3529/Irganox® 1010;
Tinuvin® 312/Cyasorb® UV 3346/Irganox® 1010;
Tinuvin® 312/Uvasorb® HA88/Irganox® 1010;
Tinuvin® 312/Tinuvin® 622/Irganox® 1010/Irgafos® 126;
Tinuvin® 312/Tinuvin® 123/Irganox® 1010/Irgafos® 126;
Tinuvin® 312/Chimassorb® 119/Irganox® 1010/Irgafos® 126;
Tinuvin® 312/Chimassorb® 944/Irganox® 1010/Irgafos® 126;
Tinuvin® 312/Chimassorb® 2020/Irganox® 1010/Irgafos® 126;
Tinuvin® 312/Cyasorb® UV 3529/Irganox® 1010/Irgafos® 126;
Tinuvin® 312/Cyasorb® UV 3346/Irganox® 1010/Irgafos® 126;
Tinuvin® 312/Uvasorb® HA88/Irganox® 1010/Irgafos® 126;
Tinuvin® 312/Tinuvin® 622/Irganox® 245;
Tinuvin® 312/Tinuvin® 123/Irganox® 245;
Tinuvin® 312/Chimassorb® 119/Irganox® 245;
Tinuvin® 312/Chimassorb® 944/Irganox® 245;
Tinuvin® 312/Chimassorb® 2020/Irganox® 245;
Tinuvin® 312/Cyasorb® UV 3529/Irganox® 245;
Tinuvin® 312/Cyasorb® UV 3346/Irganox® 245;
Tinuvin® 312/Uvasorb® HA88/Irganox® 245;
Tinuvin® 312/Tinuvin® 622/Irganox® 245/Irgafos® 126;
Tinuvin® 312/Tinuvin® 123/Irganox® 245/Irgafos® 126;
Tinuvin® 312/Chimassorb® 119/Irganox® 245/Irgafos® 126;
Tinuvin® 312/Chimassorb® 944/Irganox® 245/Irgafos® 126;
Tinuvin® 312/Chimassorb® 2020/Irganox® 245/Irgafos® 126;
Tinuvin® 312/Cyasorb® UV 3529/Irganox® 245/Irgafos® 126;
Tinuvin® 312/Cyasorb® UV 3346/Irganox® 245/Irgafos® 126;
Tinuvin® 312/Uvasorb® HA88/Irganox® 245/Irgafos® 126;
Tinuvin® 312/Tinuvin® 622/Irganox® 1726;
Tinuvin® 312/Tinuvin® 123/Irganox® 1726;
Tinuvin® 312/Chimassorb® 119/Irganox® 1726;
Tinuvin® 312/Chimassorb® 944/Irganox® 1726;
Tinuvin® 312/Chimassorb® 2020/Irganox® 1726;
Tinuvin® 312/Cyasorb® UV 3529/Irganox® 1726;
Tinuvin® 312/Cyasorb® UV 3346/Irganox® 1726;
Tinuvin® 312/Uvasorb® HA88/Irganox® 1726;
Tinuvin® 312/Tinuvin® 622/Irganox® 1726/Irgafos® 126;
Tinuvin® 312/Tinuvin® 123/Irganox® 1726/Irgafos® 126;
Tinuvin® 312/Chimassorb® 119/Irganox® 1726/Irgafos® 126;
Tinuvin® 312/Chimassorb® 944/Irganox® 1726/Irgafos® 126;
Tinuvin® 312/Chimassorb® 2020/Irganox® 1726/Irgafos® 126;
Tinuvin® 312/Cyasorb® UV 3529/Irganox® 1726/Irgafos® 126;
Tinuvin® 312/Cyasorb® UV 3346/Irganox® 1726/Irgafos® 126;
Tinuvin® 312/Uvasorb® HA88/Irganox® 1726/Irgafos® 126;
Tinuvin® 312/Tinuvin® 144/Irganox® 1010;
Tinuvin® 234/Tinuvin® 144/Irganox® 1010;
Tinuvin® 101/Tinuvin® 144/Irganox® 1010;
Tinuvin® 571/Tinuvin® 144/Irganox® 1010;
Tinuvin® 213/Tinuvin® 144/Irganox® 1010;
Tinuvin® 328/Tinuvin® 144/Irganox® 1010;
Uvinul® 3039/Tinuvin® 144/Irganox® 1010;
Uvinul® 3088/Tinuvin® 144/Irganox® 1010;
Tinuvin® 120/Tinuvin® 144/Irganox® 1010;
Tinuvin® 312/Tinuvin® 144/Irganox® 1010/Irgafos® 126;
Tinuvin® 234/Tinuvin® 144/Irganox® 1010/Irgafos® 126;
Tinuvin® 101/Tinuvin® 144/Irganox® 1010/Irgafos® 126;
Tinuvin® 571/Tinuvin® 144/Irganox® 1010/Irgafos® 126;
Tinuvin® 213/Tinuvin® 144/Irganox® 1010/Irgafos® 126;
Tinuvin® 328/Tinuvin® 144/Irganox® 1010/Irgafos® 126;
Uvinul® 3039/Tinuvin® 144/Irganox® 1010/Irgafos® 126;
Uvinul® 3088/Tinuvin® 144/Irganox® 1010/Irgafos® 126;
Tinuvin® 120/Tinuvin® 144/Irganox® 1010/Irgafos® 126;
Tinuvin® 312/Tinuvin® 144/Irganox® 245;
Tinuvin® 234/Tinuvin® 144/Irganox® 245;
Tinuvin® 101/Tinuvin® 144/Irganox® 245;
Tinuvin® 571/Tinuvin® 144/Irganox® 245;
Tinuvin® 213/Tinuvin® 144/Irganox® 245;
Tinuvin® 328/Tinuvin® 144/Irganox® 245; Uvinul® 3039/Tinuvin® 144/Irganox® 245; Uvinul® 3088/Tinuvin® 144/Irganox® 245;
Tinuvin® 120/Tinuvin® 144/Irganox® 245;
Tinuvin® 312/Tinuvin® 144/Irganox® 245/Irgafos® 126;
Tinuvin® 234/Tinuvin® 144/Irganox® 245/Irgafos® 126;
Tinuvin® 101/Tinuvin® 144/Irganox® 245/Irgafos® 126;
Tinuvin® 571/Tinuvin® 144/Irganox® 245/Irgafos® 126;
Tinuvin® 213/Tinuvin® 144/Irganox® 245/Irgafos® 126;
Tinuvin® 328/Tinuvin® 144/Irganox® 245/Irgafos® 126;
Uvinul® 3039/Tinuvin® 144/Irganox® 245/Irgafos® 126;
Uvinul® 3088/Tinuvin® 144/Irganox® 245/Irgafos® 126;
Tinuvin® 120/Tinuvin® 144/Irganox® 245/Irgafos® 126;
Tinuvin® 312/Tinuvin® 144/Irganox® 1726;
Tinuvin® 234/Tinuvin® 144/Irganox® 1726;
Tinuvin® 101/Tinuvin® 144/Irganox® 1726;
Tinuvin® 571/Tinuvin® 144/Irganox® 1726;
Tinuvin® 213/Tinuvin® 144/Irganox® 1726;
Tinuvin® 328/Tinuvin® 144/Irganox® 1726;
Uvinul® 3039/Tinuvin® 144/Irganox® 1726;
Uvinul® 3088/Tinuvin® 144/Irganox® 1726;
Tinuvin® 120/Tinuvin® 144/Irganox® 1726;
Tinuvin® 312/Tinuvin® 144/Irganox® 1726/Irgafos® 126;
Tinuvin® 234/Tinuvin® 144/Irganox® 1726/Irgafos® 126

Tinuvin® 101/Tinuvin® 144/Irganox® 1726/Irgafos® 126;
Tinuvin® 571/Tinuvin® 144/Irganox® 1726/Irgafos® 126;
Tinuvin® 213/Tinuvin® 144/Irganox® 1726/Irgafos® 126;
Tinuvin® 328/Tinuvin® 144/Irganox® 1726/Irgafos® 126;
Uvinul® 3039/Tinuvin® 144/Irganox® 1726/Irgafos® 126;
Uvinul® 3088/Tinuvin® 144/Irganox® 1726/Irgafos® 126;
Tinuvin® 120/Tinuvin® 144/Irganox® 1726/Irgafos® 126.

More particular preference is given to a polyether polyol, a polyester polyol or a polyurethane comprising one of the following blends of commercially available additives:
Tinuvin® 312/Tinuvin® 144
Tinuvin® 312/Tinuvin® 144/Irganox® 1010;
Tinuvin® 312/Tinuvin® 144/Irganox® 245;
Tinuvin® 312/Tinuvin® 144/Irganox® 245/Irgafos® 126;
Tinuvin® 234/Tinuvin® 144;
Tinuvin® 101/Tinuvin® 144;
Tinuvin® 312/Tinuvin® 144/Irganox® 1010/Irgafos® 126;
Tinuvin® 234/Tinuvin® 144/Irganox® 1010/Irgafos® 126;
Tinuvin® 120/Tinuvin® 144.

For example, a polyether polyol, a polyester polyol or a polyurethane comprises one of the following blends of commercially available additives:
TINUVIN® 234/TINUVIN® 144/Irganox® 1010/Irgafos® 126;
TINUVIN® 312/TINUVIN® 770/Irganox® 1010/Irgafos® 126;
TINUVIN® 312/TINUVIN® 622/Irganox® 1010/Irgafos® 126;
TINUVIN® 312/TINUVIN® 144/Irganox® 1010/Irgafos® 126;
TINUVIN® 328/TINUVIN® 144/Irganox® 1010/Irgafos® 126.

Most preference is given to a polyether polyol, a polyester polyol or a polyurethane comprising one of the following blends of commercially available additives:
Tinuvin® 312/Tinuvin® 144/Irganox® 1010/Irgafos® 126;
Tinuvin® 234/Tinuvin® 144/Irganox® 1010/Irgafos® 126;
Tinuvin® 312/Tinuvin® 144/Irganox® 1010/Irgafos® 126;
Tinuvin® 312/Tinuvin® 144/Irganox® 1010;
Tinuvin® 234/Tinuvin® 144/Irganox® 1010;
Tinuvin® 312/Tinuvin® 144/Irganox® 1010.

Most particular preference is given to a polyether polyol, a polyester polyol or a polyurethane comprising one of the following blends of commercially available additives:
Tinuvin® 312/Tinuvin® 144/Irganox® 1010/Irgafos® 126;
Tinuvin® 234/Tinuvin® 144/Irganox® 1010/Irgafos® 126;
Tinuvin® 312/Tinuvin® 144/Irganox® 1010/Irgafos® 126.

Of special interest is a polyether polyol, a polyester polyol or a polyurethane comprising the one of the following blends of commercially available additives:
Tinuvin® 312/Tinuvin® 234/Tinuvin® 144/Irganox® 1010/Irgafos® 126;
Tinuvin® 312/Tinuvin® 234/Tinuvin® 622/Irganox® 1010.

The stabilizers and stabilizer blends mentioned are suitable as stabilizers for polyether polyol, polyester polyol or polyurethane against oxidative, thermal and/or light-induced degradation and as reducer of fogging contribution of the polymer.

The polyether polyol, polyester polyol or polyurethane composition of the present invention may be also a foam (flexible, rigid, integral), a microcellular foam, a cast PU, a PU skin, a PU hot melt adhesive, a silylated polyurethane (SPUR), a thermoplastic polyurethane (TPU) a PU elastomer, artificial leather, PU skin, PU stray coating or reaction injection molding (RIM).

For example, polyether polyol, polyester polyol or polyurethane composition of the present invention are not foamed.

The polyurethanes are obtained, for example, by reacting polyethers, polyesters and polybutadienes which contain terminal hydroxyl groups, i.e. polyols, with aliphatic or aromatic polyisocyanates.

Polyethers and polyesters having terminal hydroxyl groups are known and are prepared, for example, by polymerizing epoxides such as ethylene oxide, propylene oxide, butylene oxide, tetrahydrofuran, styrene oxide or epichlorohydrin with themselves, for example in the presence of $BF_3$, or by addition reaction of these epoxides, alone or as a mixture or in succession, with starting components containing reactive hydrogen atoms, such as alcohols, ammonia or amines, for example ethylene glycol, propylene 1,3- and 1,2-glycol, trimethylolpropane, 4,4'-dihydroxydiphenylpropane, aniline, ethanolamine or ethylenediamine. Sucrose polyethers are also suitable in accordance with the invention. In many cases preference is given to those polyethers which predominantly (up to 90% by weight, based on all the OH groups present in the polyether) contain primary OH groups. Furthermore, polyethers modified by vinyl polymers, as are formed, for example, by polymerizing styrene and acrylonitrile in the presence of polyethers, are suitable, as are polybutadienes containing OH groups.

These compounds generally have molecular weights of 40 and are polyhydroxy compounds, especially compounds containing from two to eight hydroxyl groups, especially those of molecular weight from 800 to 10 000, preferably from 1000 to 6000, for example polyethers containing at least 2, generally 2 to 8, but preferably 2 to 4, hydroxyl groups, as are known for the preparation of homogeneous polyurethanes and cellular polyurethanes.

It is of course possible to employ mixtures of the above compounds containing at least two isocyanate-reactive hydrogen atoms, in particular with a molecular weight of 400-10 000.

Suitable polyisocyanates are aliphatic, cycloaliphatic, araliphatic, aromatic and heterocyclic polyisocyanates, for example ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and -1,4-diisocyanate and also any desired mixtures of these isomers, 1-isocyanato-3,3,5-trimethyl-5-isocyanatomethylcyclohexane, 2,4- and 2,6-hexahydrotolylene diisocyanate and also any desired mixtures of these isomers, hexahydro-1,3- and/or -1,4-phenylene diisocyanate, perhydro-2,4'- and/or -4,4'-diphenylmethanediisocyanate, 1,3- and 1,4-phenylene diisocyanate, 2,4- and 2,6-tolylene diisocyanate, and also any desired mixtures of these isomers, diphenylmethane 2,4'- and/or -4,4'-diisocyanate, naphthylene 1,5-diisocyanate, triphenylmethane 4,4',4''-triisocyanate, polyphenyl-polymethylene polyisocyanates as are obtained by aniline-formaldehyde condensation followed by phosgenization, m- and p-isocyanatophenylsulfonyl isocyanates, perchlorinated aryl polyisocyanates, polyisocyanates containing carbodiimide groups, polyisocyanates containing allophanate groups, polyisocyanates containing isocyanurate groups, polyisocyanates containing urethane groups, polyisocyanates containing acylated urea groups, polyisocyanates containing biuret groups, polyisocyanates containing ester groups, reaction products of the above-mentioned isocyanates with acetals, and polyisocyanates containing polymeric fatty acid radicals.

It is also possible to employ the isocyanate group-containing distillation residues as they are or dissolved in one or more of the above-mentioned polyisocyanates, which are obtained in the course of the industrial preparation of isocyanates. It is additionally possible to use any desired mixtures of the above-mentioned polyisocyanates.

Particular preference is given in general to the polyisocyanates which are readily obtainable industrially, for example aromatic isocyanates such as 2,4- and 2,6-tolylene diisocyanate and any desired mixtures of these isomers ("TDI"), polyphenyl-polymethylene-polyisocyanates as prepared by aniline-formaldehyde condensation followed by phosgenization ("crude MDI"), and polyisocyanates containing carbodiimide, urethane, allophanate, isocyanurate, urea or biuret groups ("modified polyisocyanates").

Polyurethane is preferably prepared from liquid starting components, i.e. the starting materials to be reacted with one another being mixed together in a one-shot process.

Incorporation of the additives and/or stabilizer blends into the polyether polyol, polyester polyol or polyurethane is carried out by known methods, for example before or during compounding, extrusion, co-extrusion or can also be added before or during polymerisation or before crosslinking. In case the additives and/or stabilizer blends are added before polymerisation, they can be dissolved in one or all reactants. They are preferably dissolved in the polyether polyol or polyester polyol.

The compositions of this invention will help to fulfil needs and/or requirements for the polyurethane industry, in providing polyurethane (PU) compounds, thermoplastic PU, cast PU, reaction injection molding (RIM), spray coating, PU skin.

The compositions according to the invention can be advantageously used for various purposes and for the preparation of various shaped articles. Examples are:

V) Adhesive, Coating and Elastomer
V-1) PU Elastomer
V-1-A) Electrical and electronic industry
Bushes, cable connections, components for electrical control and adjustment, electromagnetic switches, hard and elastomeric encapsulants, gear shift cable castings for motor vehicle electrics, insulants, printed circuits, potting, semiconductors, switches, switch gears, medium and high voltage transformers.
V-1-B) Heavy-duty industry
Wheels, conveyor belts, sieves and linings.
V-1-C) Leisure
Skate board roller.
V-2) Adhesives
V-2-A) Automotive
Bonding of textile onto foam, direct glazing of vehicle windscreens, glazing replacement, fastening of various car components, vacuum lamination of foil to fiberboard.
V-2-B) Building and civil engineering
Bonding of sandwich insulation panels, flooring, roofs, sealing of car parks, concrete pavements, industrial floors, one component sealant for vertical joints (precast concrete panels, expansion joints), pourable joint sealants for vertical surfaces (floor-to-wall joints).
V-2-C) Carpentry
Furniture assembly and profile lamination of wood to plastic.
V-2-D) Flexible packaging
Film-to-film and film-to-foil lamination.
V-2-E) Footwear
Bonding of shoe soles.
V-2-F) General industry
Electronics industry, household goods, loudspeaker acoustic panels, office furniture, metal window frames, air conditioning systems, buses, containers, lorries, metal/sheet metal constructions, railway carriages, sewerage works, silos and ventilation systems.
V-2-G) Insulated glazing
V-2-H) Rubbercrumb
Binding agent for re-milled rubber waste; the composite materials are mainly used as molded tiles, playgrounds (in-situ), running tracks (in-situ).
V-2-J) Sandwich construction
Binding of similar substrates together or to other materials such as metals, plastics and rigid foam; used in a variety of laminated panels, such as panels for buildings, caravans, partition walls, refrigerated trucks, containers and cold storages.
V-3) Polyurethane Hotmelts
V-3-A) Automotive applications, in particular as instrument clusters, sound insulation, carpeting, seating, decorative trim, exterior applications such as weather stripping, exterior trim, light lens units, and windshield assemblies, recreational vehicle side walls.
V-3-B) Textile applications, in particular lamination, profile wrapping.
V-3-C) Furniture industry, in particular for bonding bond solid wood, wood composites, metal hardware, and decorative plastic laminates.
V-3-D) Construction industry, in particular assembly of door and window frames and corner covering for linoleum flooring.
VI) TPU
VI-1) Adhesive Grade
Adhesives for shoe (bond upper to sole), toe caps (powder), furniture, do it yourself and automotive.
VI-2) Extrusion grades
VI-2-A) Cable and wire applications
Household appliances cables, outdoor electrical cables, industrial cables and wire.
VI-2-B) Hoses and tubes
Pneumatic transport systems, ventilation systems, pneumatic control units, pneumatic breaks, hydraulic tubes, corrugated pipes, fire hoses, vacuum cleaner tubes.
VI-2-C) Profile applications
Round cords, tooth belts, gaskets, bowden cables, stripper blades, cables.
VI-3) Film and sheet
These are made from both aromatic and aliphatic TPUs. Typical applications are barrier film, adhesive film, seam tape, inter layer in security glass.
VI-3-A) Optical applications of aliphatic TPU
Security laminates, security display screens.
VI-3-B) Non-optical applications of aliphatic TPU
Traffic and warning signs, protective films for exterior automotive applications, industrial tapes, industrial boats and balloons, film for food packaging, aerospace.
VI-3-C) Melt coatings
Belts for food transportation and industrial goods.
VI-4) Injection molding
VI-4-A) General purpose
Ear tags, wheels, horse shoes, plugs, wrist watch straps.
VI-4-B) Hi-performance/special compounds
Transparent soles for sport shoes, frames for ski goggles, technical parts, screens (mining).
VI-4-C) Automotive applications
Gear shift knobs, bearing sockets, cable plugs, bushings, casings, friction bearings.
VI-4-D) Seal applications
Hydraulic seals, stripper rings, gaskets, pneumatic seals, membranes.
VII) Automotive applications
Bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side moldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

VII-1) Flexible Foam, in particular arm rest, head restraints, acoustic foam carpet, seats.

VII-2) Semi-rigid foam, in particular roof liners, hat racks, door panels, arm rest, instrument panel, head-impact, side-impact.

VII-3) Rigid foam, in particular foam filling of cavities.

VII-4) Flexible integral foam, in particular steering wheel, air filter, gearshift knob, spoiler, cable sheeting, head restraints.

VII-5) RIM, in particular bumpers, sun roof, front and rear skirts, door sill scuff plates.

VII-6) TPU, in particular front and rear skirts, doorsill scuff plates, cable sheeting, gearshift knob, instrument panel.

VII-7) Cast PU systems, in particular spring aids, spring isolation, seat damping, top mounts, roll restrictors, emergency wheel, body mounts, stops in door systems.

VIII) Footwear

Shoes/shoe-soles (insoles, spats, adhesives, structural adhesives).

IX) Furniture

X) Support devices

Articles for the leisure time such as sports and fitness devices, gymnastics mats, ski-boots, inline-skates, skis, big foot, athletic surfaces (e.g. tennis grounds).

XI) Others

Composite panels, insulation board and block, technical insulation, pipe insulation, food boxes (fruit, vegetables, meat, fish), synthetic paper, labels for bottles, couches, human artificial joints, printing plates (flexographic), printed circuit boards, display technologies, screw tops, tops and stoppers for bottles, and cans.

For example
1) PU elastomers
2) PU skin
3) PU spray coating
4) Thermoplastic polyurethane (TPU)
5) PU artificial leather
6) Silylated polyurethane (SPUR)
7) PU hot melt adhesives
8) Cast PU
9) PU foam (flexible, rigid, integral)
10) PU microcellular
11) Reaction injection molding (RIM).

Thus, a further embodiment of the present invention relates to a shaped article, in particular artificial leather, shock-absorbers, rollers of inline-skates and footwear, containing a composition as described above.

EXAMPLES

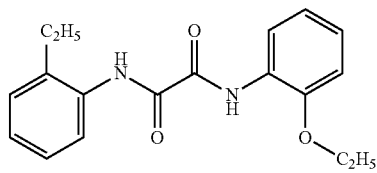

Tinuvin® 312 (UV-absorber)

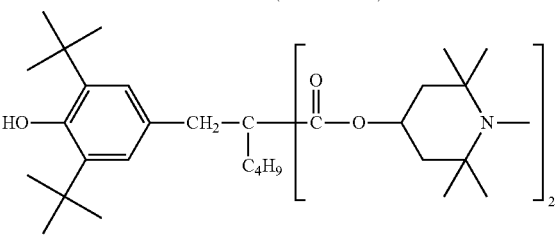

Tinuvin® 144 (hindered amine light stabilizer)

Percentages and ratios mean weight percent and weight ratios.

Compounding:

2.5 kg of thermoplastic polyurethane (TPU) pellets (Desmopan® 385 S of Bayer Material Science®) are mixed to homogeneity in a tumble mixer with 0.33% of pentaerythritol tetrakis 3-(3,5-di-tert-butyl-4-hydroxyphenyl)propionate (Irganox® 1010), 0.17% of bis(2,4-di-tert-butylphenyl) pentaerythritol diphosphite (Irgafos® 126), and with the light stabilizer combinations given in the tables below. This blend is then extruded in a twin-screw extruder of Berstorff® at a temperature of at most 180° C. After drawing the extrudate through a waterbath to cool, it is granulated.

Injection Molding:

64 mm×40 mm×2 mm test panels are moulded from these granules by means of an injection-moulding machine (Arburg® 320 S) at a temperature of at most 180° C. (mold temperature 50° C.). The samples are exposed in a Weatherometer (WOM) bpt 63° C., 0.35 W/m2.

Film Preparation 4 g of TPU pellets are dissolved 22 g DMF as a solvent. TPU films are prepared by drawing film with a 250 micron doctor blade. The DMF solvent is evaporated and the films are dried. The final film thickness is about 40 micron.

Light Exposure

The samples are exposed in a Weatherometer (WOM) bpt 63° C., 0.35 W/m$^2$ nm at $\lambda$=340 nm.

Kalahari exposure is done according to VW Test PV 3929 with xenon light exposure at 75 W/m$^2$ at $\lambda$=300-400 nm.

Color Measurement:

The color quality is reported in terms of Yellowness Index (YI) determined on the TPU samples in accordance with the ASTM 1926-70 Yellowness Test. Low YI values denote little discoloration, high YI values severe discoloration of the samples. The whiter the TPU the better the TPU is stabilized.

TABLE 1

Determination of initial color and light stability obtained with various light stabilizer systems. (Measured according to ASTM 1926-70). 2 mm plaques, Weatherometer (WOM) bpt 63° C., 0.35 W/m2

| Formulation | % | Light stabilizers* | Initial Color (YI: yellowness index) | 72 h | 144 h | 240 h | 316 h | 460 h |
|---|---|---|---|---|---|---|---|---|
| 1 | | blank | 11.9 | 35.8 | 49.4 | 55.9 | 60.0 | 66.4 |
| 2 | 0.50% | TINUVIN ® 234 | 14.2 | 13.8 | 16.1 | 20.6 | 23.9 | 28.5 |
|   | 0.50% | TINUVIN ® 144 | | | | | | |
| 3 | 0.50% | TINUVIN ® 312 | 10.9 | 12.4 | 17.6 | 26.7 | 34.4 | 42.1 |
|   | 0.50% | TINUVIN ® 622 | | | | | | |
| 4 | 0.50% | TINUVIN ® 312 | 9.6 | 9.9 | 13.7 | 20.3 | 25.4 | 32.8 |
|   | 0.50% | TINUVIN ® 144 | | | | | | |

*All formulations in Table 1 contain 0.33% IRGANOX ® 1010 and 0.17% IRGAFOS ® 126

TABLE 2

Determination of initial color and light stability obtained with various light stabilizer systems. (Measured according to ASTM 1926-70). Film, Weatherometer (WOM) bpt 63° C., 0.35 W/m2

| Formulation | % | Light stabilizers* | 15 h | 41 h | 108 h |
|---|---|---|---|---|---|
| 5 | | blank | 3.1 | 6.3 | 34.1 |
| 6 | 0.50% | TINUVIN 234 | 2.3 | 3.6 | 5.5 |
|   | 0.50% | TINUVIN 144 | | | |
| 7 | 0.50% | TINUVIN 312 | 2.7 | 2.9 | 5.4 |
|   | 0.50% | TINUVIN 622 | | | |
| 8 | 0.50% | TINUVIN 312 | 2.2 | 3.5 | 5.5 |
|   | 0.50% | TINUVIN 144 | | | |

*All formulations in Table 2 contain 0.33% IRGANOX ® 1010 and 0.17% IRGAFOS ® 126

TABLE 3

Determination of initial color and light stability obtained with various light stabilizer systems. (Measured according to ASTM 1926-70). 2 mm plaques, Kalahari exposure (VW Test PV 3929)

| Formulation | % | Light stabilizers* | 96 h | 144 h |
|---|---|---|---|---|
| 9 | | blank | 53.9 | 58.7 |
| 10 | 0.50% | TINUVIN 234 | 18.9 | 22.1 |
|    | 0.50% | TINUVIN 144 | | |
| 11 | 0.33% | TINUVIN 234 | 23.4 | 27.0 |
|    | 0.67% | TINUVIN 144 | | |
| 12 | 0.75% | TINUVIN 312 | 16.8 | 23.3 |
|    | 0.25% | TINUVIN 144 | | |
| 13 | 0.67% | TINUVIN 312 | 17.4 | 22.6 |
|    | 0.33% | TINUVIN 144 | | |
| 14 | 0.50% | TINUVIN 312 | 18.8 | 22.3 |
|    | 0.50% | TINUVIN 144 | | |
| 15 | 0.33% | TINUVIN 312 | 23.4 | 28.8 |
|    | 0.67% | TINUVIN 144 | | |
| 16 | 0.33% | TINUVIN 234 | 15.9 | 21.3 |
|    | 0.33% | TINUVIN 312 | | |
|    | 0.33% | TINUVIN 144 | | |
| 17 | 0.25% | TINUVIN 234 | 17.9 | 23.6 |
|    | 0.25% | TINUVIN 312 | | |
|    | 0.50% | TINUVIN 144 | | |
| 18 | 0.50% | TINUVIN 328 | 19.5 | 23.4 |
|    | 0.50% | TINUVIN 144 | | |
| 19 | 0.33% | TINUVIN 328 | 19.3 | 25.0 |
|    | 0.67% | TINUVIN 144 | | |

*All formulations in Table 3 contain 0.33% IRGANOX ® 1010 and 0.17% IRGAFOS ® 126

What is claimed:

1. A composition comprising
   (a) a polyether polyol, a polyester polyol or a polyurethane,
   (b) a UV-absorber of formula (Ia) and a hindered amine light stabilizer of formula (II),

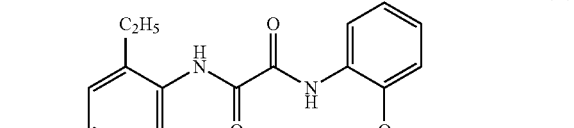
(Ia)

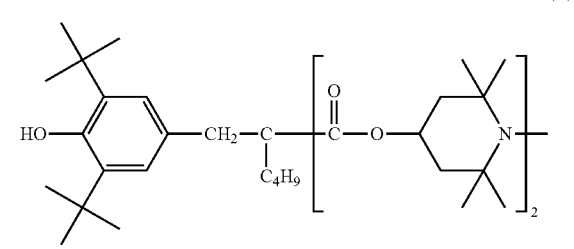
(II)

2-(2-hydroxy-3,5-bis-1,1-dimethylbenzyl)phenyl)-2H-benzotriazole, a phenolic antioxidant and a phosphite, where the overall amount of component (b) is 0.5% to 2%, by weight, based on the weight of the composition and the weight ratio of compounds of formulae (Ia):(II) is from 3:1 to 1:3.

2. A composition according to claim 1, further comprising
   (c) a hindered amine light stabilizer of formula HA-1 to HA-11 or a UV-absorber of formula UV-5 to UV-8, where the overall amount of (b) and (c) is 0.5% to 2% by weight, based on the weight of the composition,

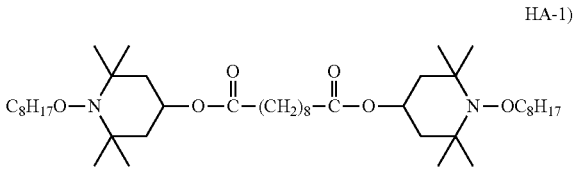
HA-1)

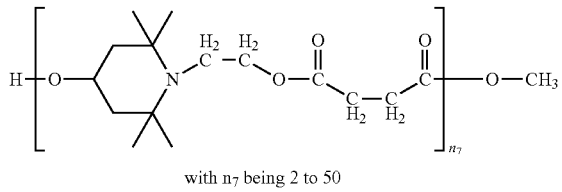
HA-2)

with $n_7$ being 2 to 50

HA-3)
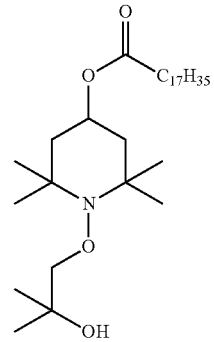
HA-4)
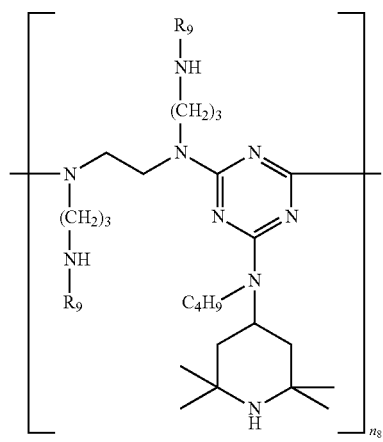
with $n_8$ being 2 to 12
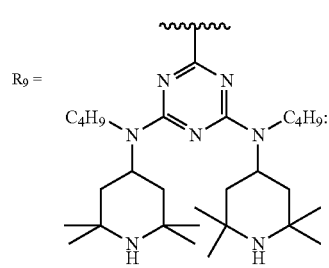
HA-5)
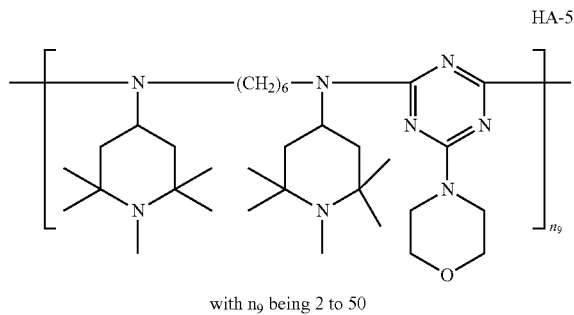
with $n_9$ being 2 to 50
HA-6)
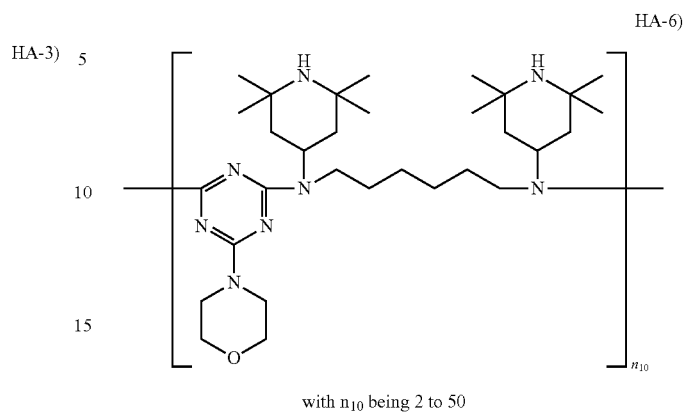
with $n_{10}$ being 2 to 50
HA-7)
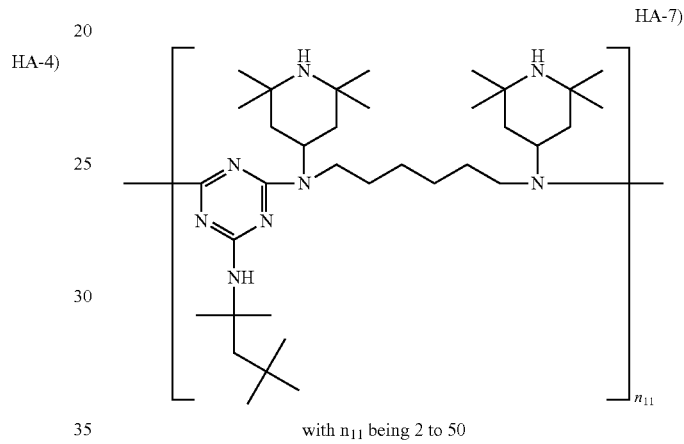
with $n_{11}$ being 2 to 50
HA-8)
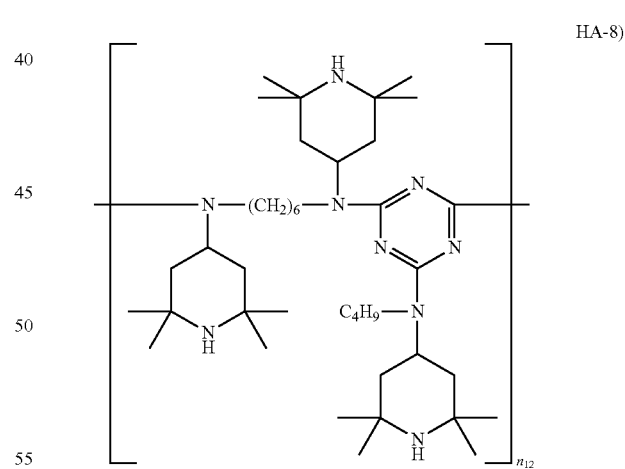
with $n_{12}$ being 2 to 50
HA-9)
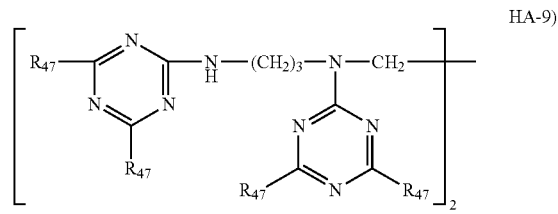

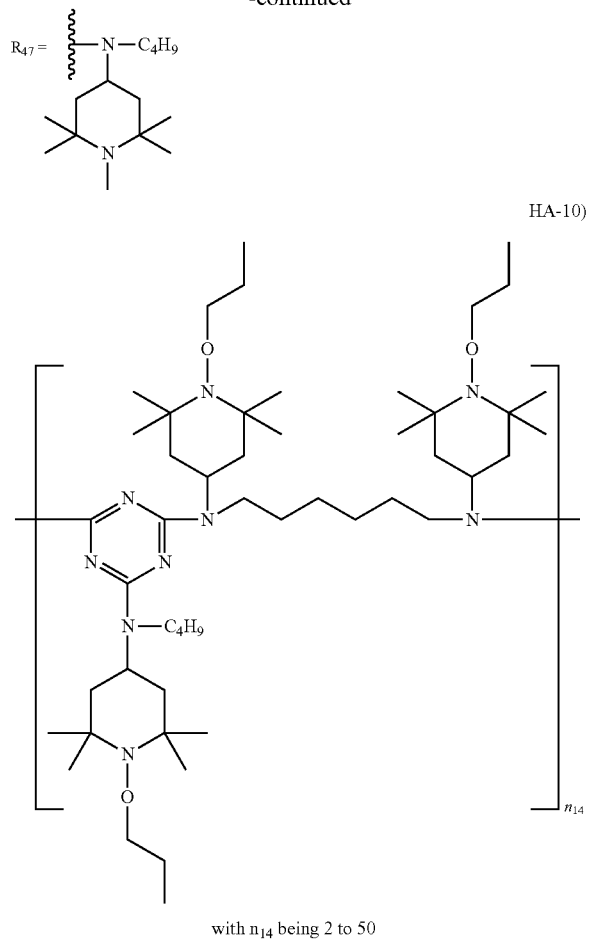

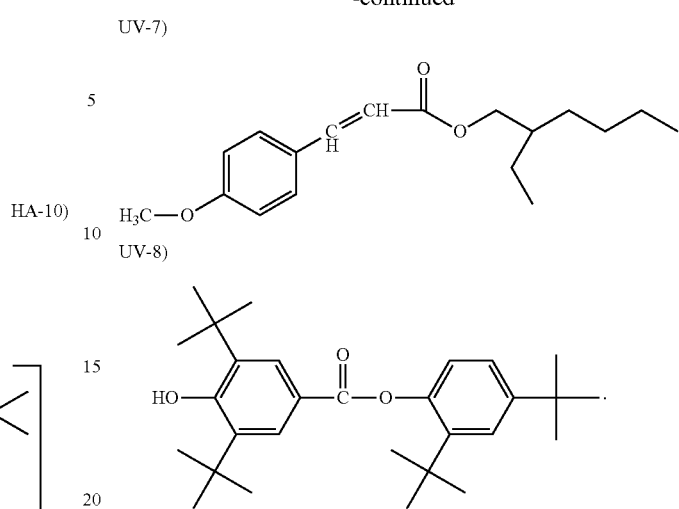

with n₁₄ being 2 to 50

HA-11) 7-oxa-3,20-diazadispiro[5.1.11.2]heneicosan-21-one, 2,2,4,4-tetramethyl-20-(oxiranylmethyl)-, polymer with (chloromethyl)oxirane

UV-5)

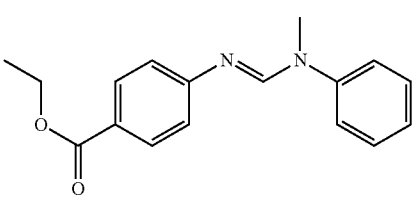

UV-6)

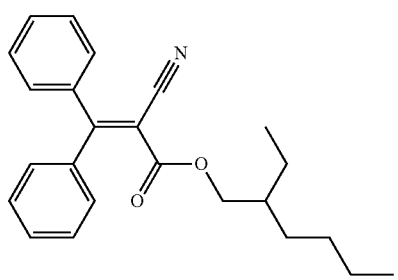

3. A process for stabilizing a polyether polyol, a polyester polyol or a polyurethane against degradation by light, oxygen and/or heat, which process comprises incorporating therein (b) a UV-absorber of formula (Ia) and a hindered amine light stabilizer of formula (II),

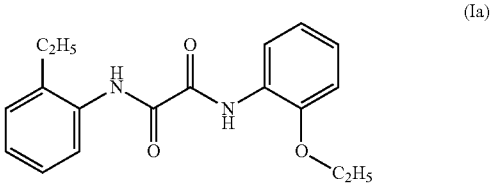

(Ia)

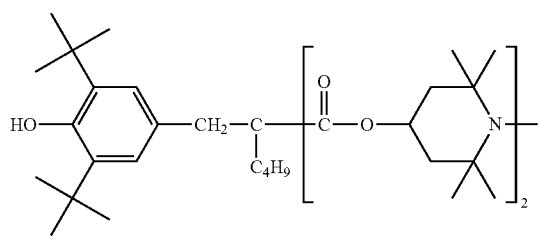

(II)

2-(2-hydroxy-3,5-bis-1,1-dimethylbenzyl)phenyl)-2H-benzotriazole, a phenolic antioxidant and a phosphite, where the overall amount of component (b) is 0.5% to 2%, by weight, based on the weight of the resultant composition and the weight ratio of compounds of formulae (Ia): (II) is from 3:1 to 1:3.

4. A composition according to claim 1, where the phenolic antioxidant is pentaerythritol tetrakis 3-(3,5-di-tert-butyl-4-hydroxyphenyl)propionate and the phosphite is bis(2,4-di-tert-butylphenyl) pentaerythritol diphosphite.

* * * * *